United States Patent [19]

Lewis

[11] Patent Number: 5,851,055
[45] Date of Patent: Dec. 22, 1998

[54] INFLATABLE PASSENGER-SIZE ADJUSTABLE TORSO BELT SYSTEM INCLUDING ENCLOSURE MOUNT AND METHOD OF PASSENGER RESTRAINT

[75] Inventor: Donald J. Lewis, Scottsdale, Ariz.

[73] Assignee: Universal Propulsion Company, Inc., Phoenix, Ariz.

[21] Appl. No.: 815,658

[22] Filed: Mar. 13, 1997

[51] Int. Cl.[6] .................................................. B60R 22/28
[52] U.S. Cl. ................ 297/483; 297/216.1; 297/216.13; 297/DIG. 3; 280/733
[58] Field of Search ............................. 297/DIG. 3, 483, 297/216.1, 216.13, 468; 280/733

[56] References Cited

U.S. PATENT DOCUMENTS

| 3,869,145 | 3/1975 | Takada | 280/733 |
|---|---|---|---|
| 5,303,953 | 4/1994 | Kamiyama et al. | 280/733 |
| 5,445,411 | 8/1995 | Kamiyama et al. | 280/733 |
| 5,465,999 | 11/1995 | Tanaka et al. | 280/733 |

Primary Examiner—Milton Nelson, Jr.
Assistant Examiner—Anthony D. Barfield
Attorney, Agent, or Firm—Pennie & Edmonds LLP

[57] ABSTRACT

A vehicle passenger restraint system in which a belt band includes a lap belt portion which may or may not be inflatable and an inflatable torso belt portion. The toro belt portion is partially mounted in an enclosure which prevents substantial inflation with the remainder of the torso belt portion positioned to protect the passenger. When a large passenger buckles-up more torso belt is withdrawn from the enclosure. Upon activation of the inflator with a larger passenger buckled-up, gases are supplied to the torso belt portion in the enclosure with less gas remaining in the enclosure and more gas being supplied to the torso belt portion outside the enclosure which portion protects the larger passenger.

When a small passenger buckles-up, less gas is supplied the torso belt portion outside the enclosure.

23 Claims, 11 Drawing Sheets

5,851,055

INFLATABLE PASSENGER-SIZE ADJUSTABLE TORSO BELT SYSTEM INCLUDING ENCLOSURE MOUNT AND METHOD OF PASSENGER RESTRAINT

BACKGROUND OF THE INVENTION

Proposals for inflatable belts for use in restraining vehicle occupants are old (U.S. Pat. Nos. 3,866,940 and 3,970,329). However, since vehicle occupants vary substantially in size from small children to large men, the lengths of belt portions required for lap and torso use varies substantially. This variation is sometimes accommodated by adjusting the position of the seat relative to the shoulder attachment point or by varying the position of the shoulder attachment point itself. Additionally inflators normally discharge a given volume of gases, the volume of gases supplied to a shorter inflating belt serving a small belted person should be less than the volume of gases supplied to a longer inflating belt serving a larger belted person.

The present invention provides an arrangement for controlling the volume of gas delivery to a band belt, having torso and lap portions, of a restraining system to serve varying sized vehicle occupants.

SUMMARY OF THE INVENTION

Broadly, the present invention comprises a restraint system and a method of restraint employing an elongated band of multiple tandemly connected sections including an inflatable shoulder or torso belt section and an inflating or non-inflatable lap belt section. The lap belt section is anchored on either side of the vehicle seat. The torso inflatable section consists of a belt portion across the torso and a belt portion housed in a stationary enclosure in the back of the seat or located in another adjacent vehicle area.

The belt portion housed in the enclosure is provided inflation gases to cause inflation upon a pending collision situation. The inflatable torso section may be tandemly connected to the inflator and in turn the inflator may be connected to an anchor arrangement.

Adjustments for an occupant's size may be accommodated by providing an arrangement for allowing the tandemnly connected inflator to reciprocate in the enclosure as the belt torso portion is drawn out of the enclosure. Such enclosure serves both as an inflator guide and to prevent full inflation of the inflatable torso belt portion remaining in the enclosure and not positioned across the passenger's torso.

A belt buckle with a prong is attached to the lap section of the elongated band which buckle prong is drawn across the passenger's lap and connected to a belt anchor. Most of the belting required is payed out of an anchor-retractor adjacent the enclosure carrying the inflator and a portion of the inflatable belt section. One end of the enclosure has an exit adjacent the passenger's torso. This enclosure end may include an orifice restriction which controls the flow of gases from the enclosed belt partially inflating portion to the fully inflating belt portion outside the enclosure.

The present invention provides a restraint band including a torso section of total fixed length to accommodate different sized passengers in which a variable length portion of the torso inflatable section is housed in an enclosure together with the inflator it serves. Upon initiation of the inflator, gases flow from the inflator initially into the partially inflating section of the torso belt portion located in the enclosure and then into that portion of the belt positioned to restrain the passenger's torso. The enclosure is sized to prevent any substantial inflation of the belt portion therein. Gases subsequently flow to the portion of the torso belt outside the enclosure where inflation of the torso portion provides protection of the occupant.

DESCRIPTION OF THE PREFERRED EMBODIMENT

Figure 1A:
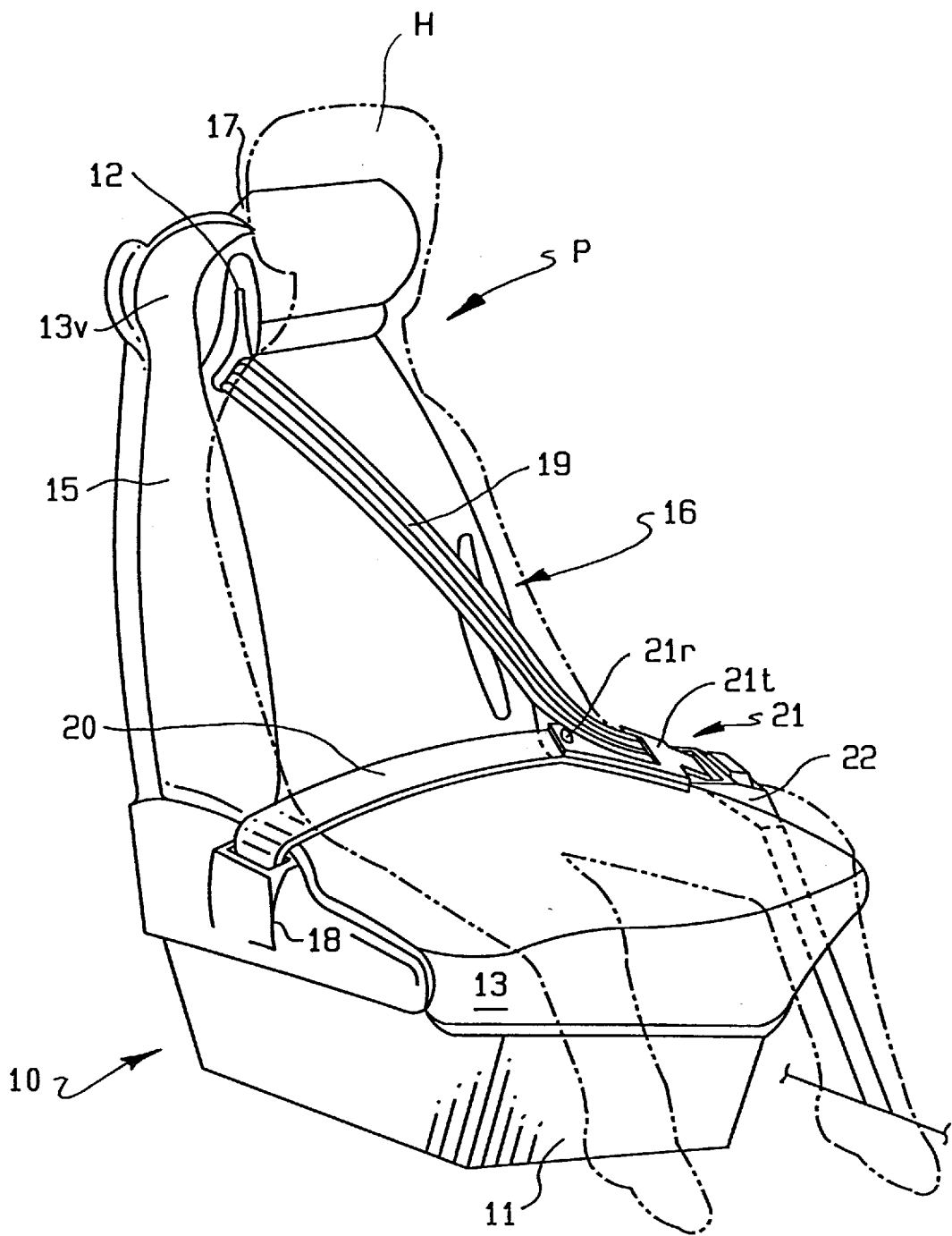
FIG. 1A is a perspective view of a belt system of the present invention buckled around a seat passenger (P)
Figure 1B:
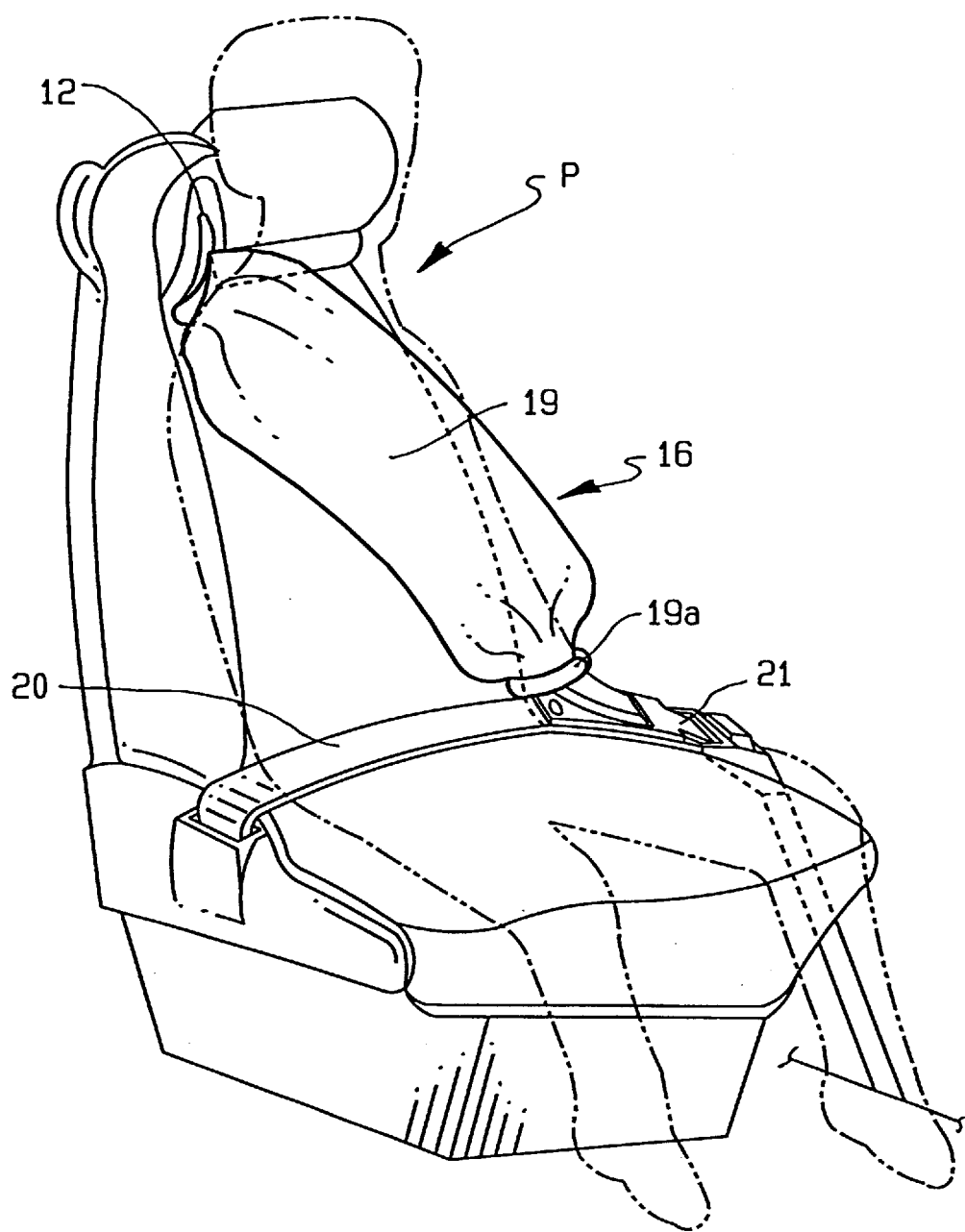
FIG. 1B is a view similar to the view of FIG. 1A with the external portion of the belt system shown inflated.

Turning to FIGS. 1A and 1B, vehicle seat 10 includes base 11, generally horizontal seat base portion 13, seat back portion 15, seat side retractor enclosure 18, and upper belt enclosure exit aperture 12 located in upper seat portion 13v adjacent the passenger's head (H) and head rest 17 to support and protect the passenger's head.

Unitary elongated band 16 includes, as major components, inflatable torso belt section 19 and inflatable or uninflatable lap section 20 (uninflated shown) which belt sections 19, 20 are preferably fabricated as one piece if both inflate or, alternatively can be tandemly or otherwise connected, particularly if belt section 20 is a non-inflatable lap belt. Buckle tongue unit 21, which is attached to uninflatable belt portion 20 by a shearable fastener rivet 21r, is drawn across the seated passenger (P) and inserted into anchor 22 of lap belt portion 20 (see FIG. 1A). Because buckle tongue unit 21 is secured to lap portion 20 by rivet 21r as the passenger buckles up most of the additional length of band 16 required to extend around passenger (P) is drawn from base take-up retractor 36 (see FIG. 2). FIG. 1B shows shoulder or torso belt section 19 in its inflated condition.

Figure 2:
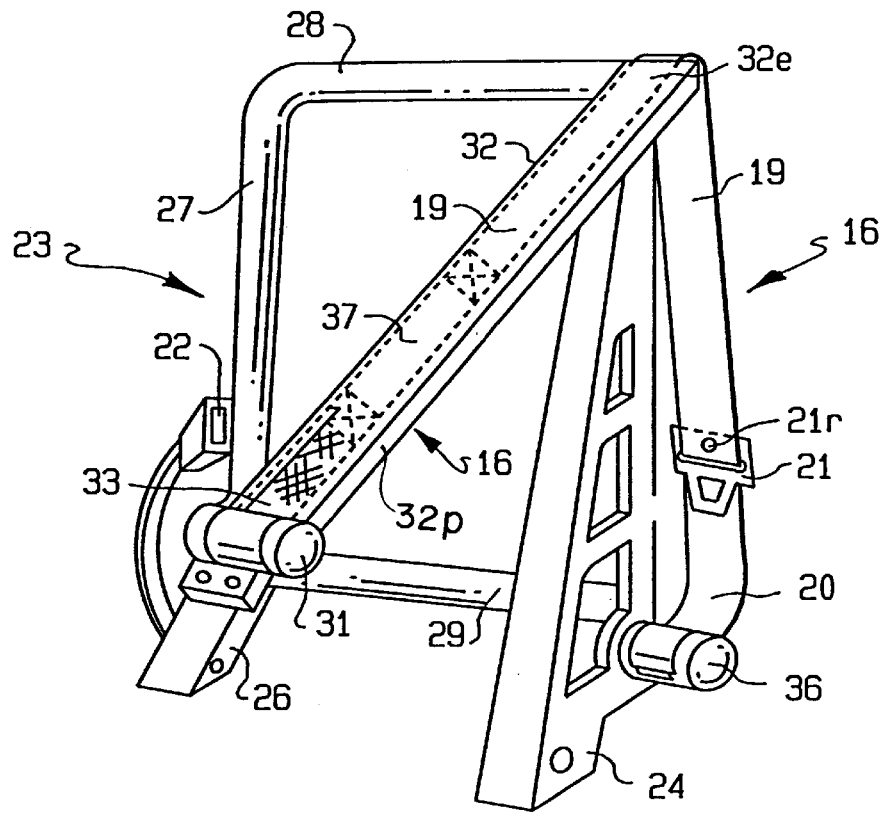
FIG. 2 is a rear perspective view of the belt system mounted on a seat frame with inflatable torso belt portion and its tandem components being supplied from an anchor retractor positioned on a seat frame.
Figure 3:
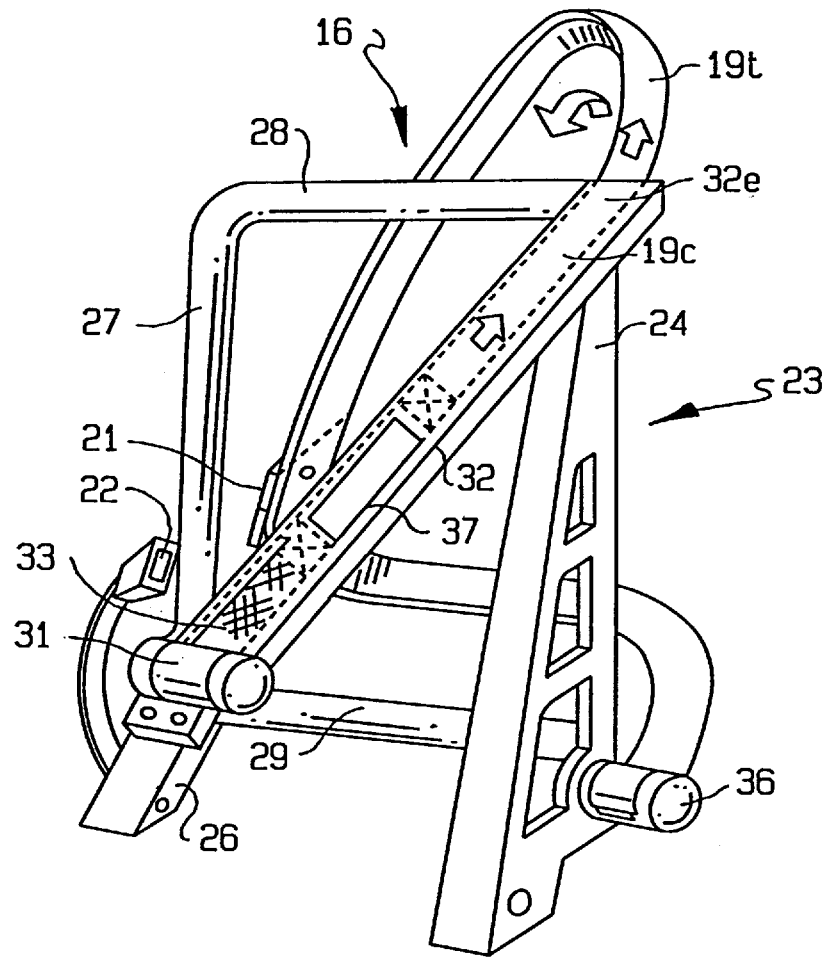
FIG. 3 is a rear perspective view of the belt system with the tandem belt band about to be buckled around a passenger (not shown)
Figure 3A:
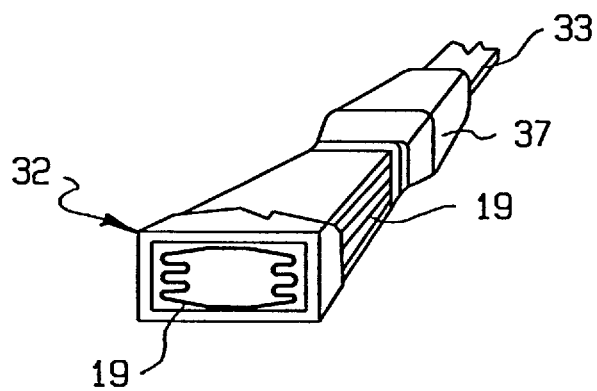
FIG. 3A is a perspective view of a portion of the enclosure, a tandemnly connected inflatable belt, inflator and inflator web section.

Turning now to FIGS. 2, 3 and 3A, seat frame 23 of seat 10 (with the remainder of the seat 10 not shown for illustrative purposes) includes inside A-frame upright 24, footstand piece 26, upright tubular frame piece 27, upper cross-piece 28 and lower cross-piece 29. Rear belt retractor 31 is mounted on foot piece 26 and lower crosspiece 29. Attached to spring-loaded wound retractor 31 and positioned at a diagonal angle on the back of frame 23 is enclosure 32 having passageway 32p therethrough for housing band 16's web belt payout portion 33 which tandemly-connects with inflator 37 and inflatable torso belt section 19. The upper end 32e of enclosure 32 is attached to the upper crosspiece 28. It should be understood that the enclosure 32 can alternately be positioned along the side or made integral to A-frame upright 24 (not illustrated)

FIG. 2 shows belt band 16 unbuckled with web belt 33 wound onto and only partially payed out from retractor 31.

FIG. 3 shows band 16 in its about-to-be buckled-up position with a selected portion of inflatable belt torso section 19 having been moved up and through enclosure 32, out enclosure exit 32e and around passenger (P) (not shown).

In FIG. 3A, there is shown enclosure 32, passageway 32p, the passageway-housed belt portion 19c of folded belt section 19, inflator 37 and web payout portion 33. These elements are connected in tandem with inflator 37 sized and shaped to reciprocate in cutaway enclosure 32.

Figure 4:
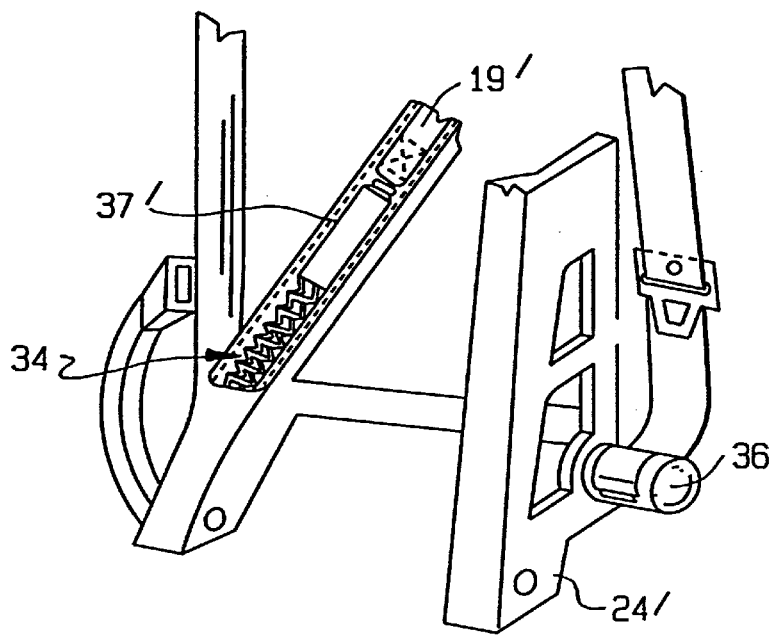
FIG. 4 is a rear perspective view showing an alternative embodiment in which an electrically conductive, insulated spring pair are used instead of a retractor and web section to accomplish inflatable belt and inflator reciprocal movement as well as to transit electrical ignition signals to the inflator.

Turning to FIG. 4, there is shown an alternative embodiment in which spring-loaded take-up reel 31 and belt web 33 are replaced with dual (or pair) insulated extension spring 34 to permit the adjustment of the position of inflatable belt section 19 as the restraint system is operated.

Figure 5:
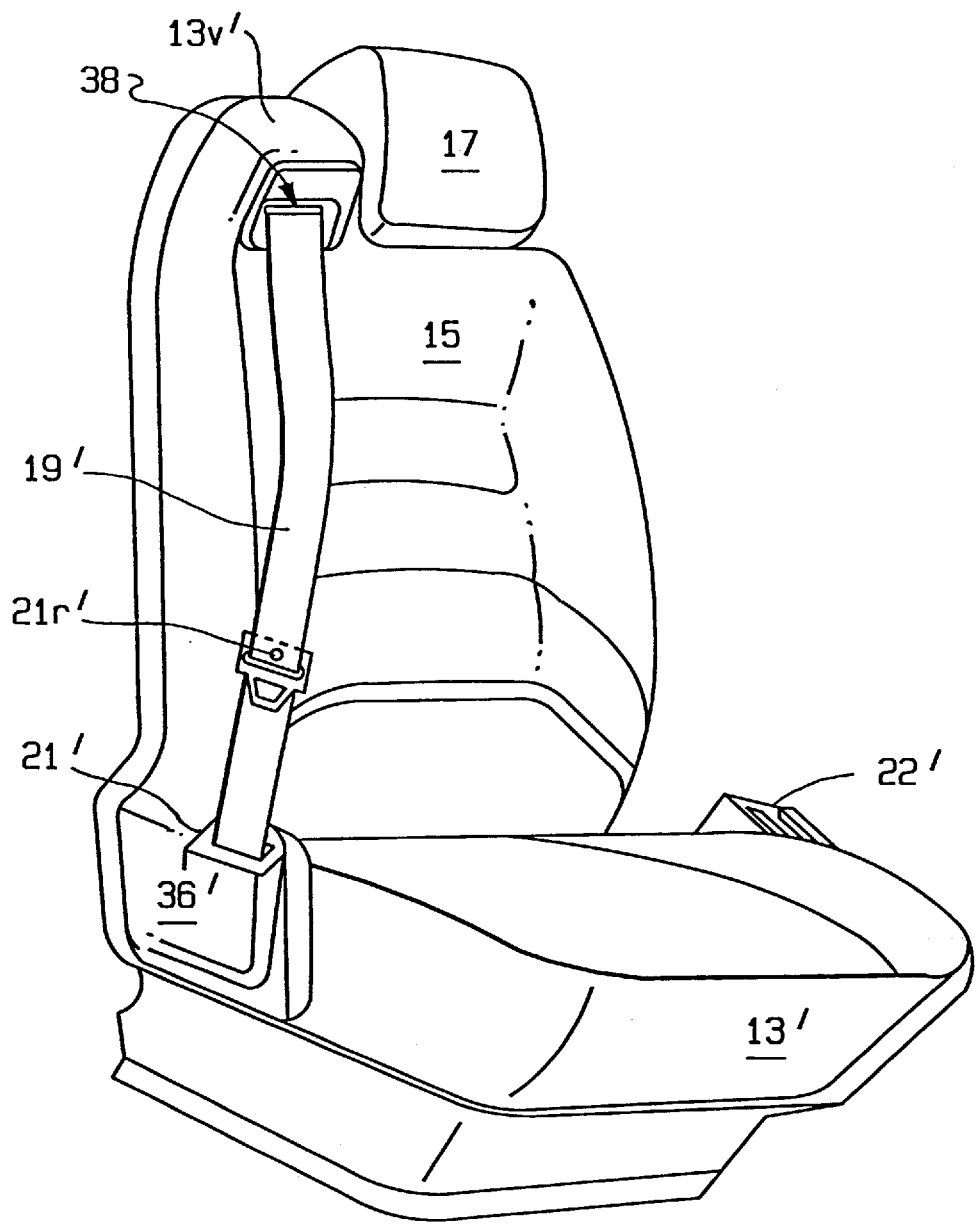
FIG. 5 is a front perspective view of the belt system in a seat in the unbuckled mode with the torso portion exiting an upper horizontal slot.

FIG. 5 shows a further alternative embodiment in which belt section 19' exits from an upper horizontal slot 38 in upper seat portion 13v' which slot 38 is adjacent to upper end 32e of elongated enclosure 32.

Figure 6A:
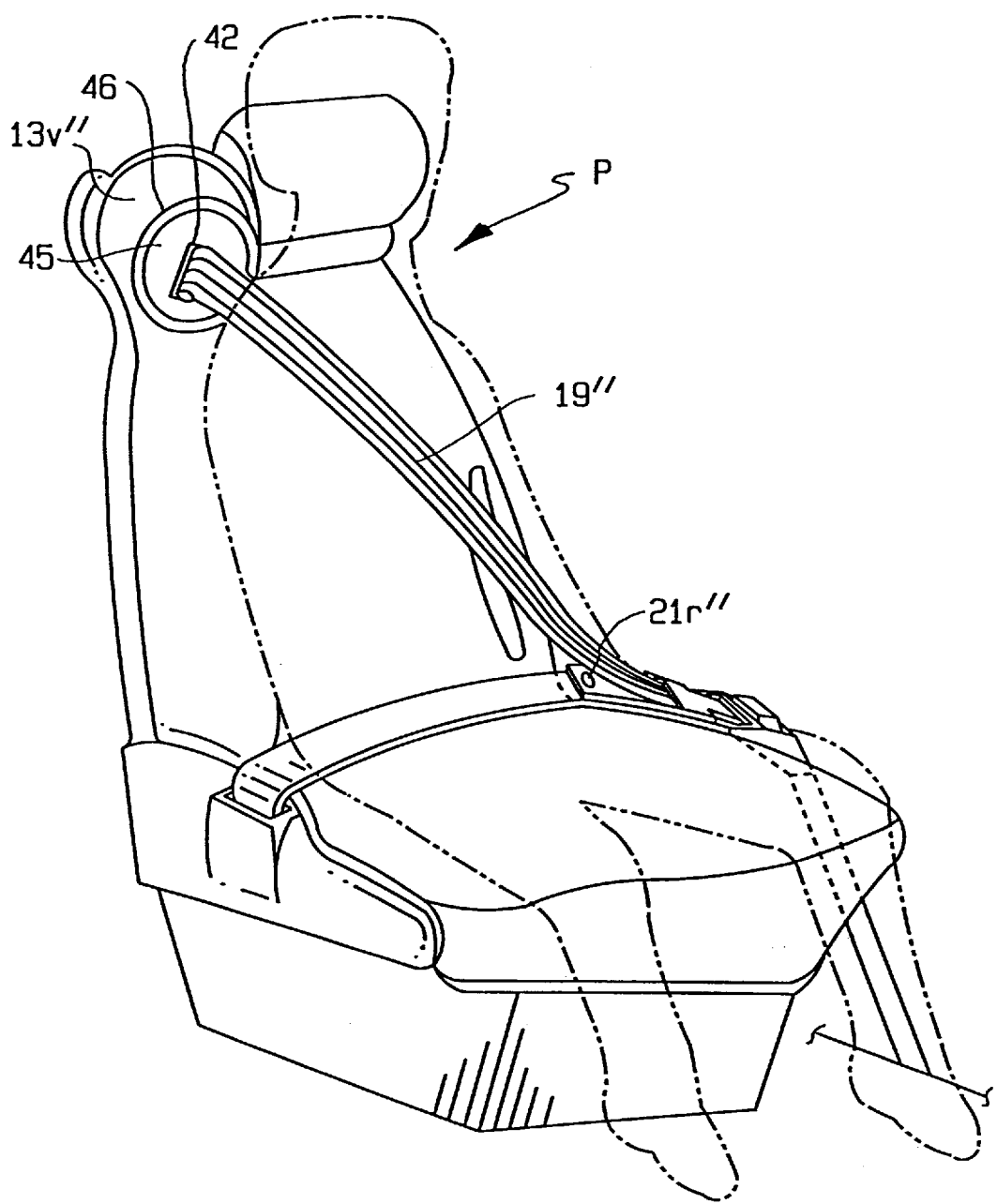
FIG. 6A is a front perspective view of a further embodiment of the belt system with the torso section exiting from a slot position in a round unit in the upper back.
Figure 6B:
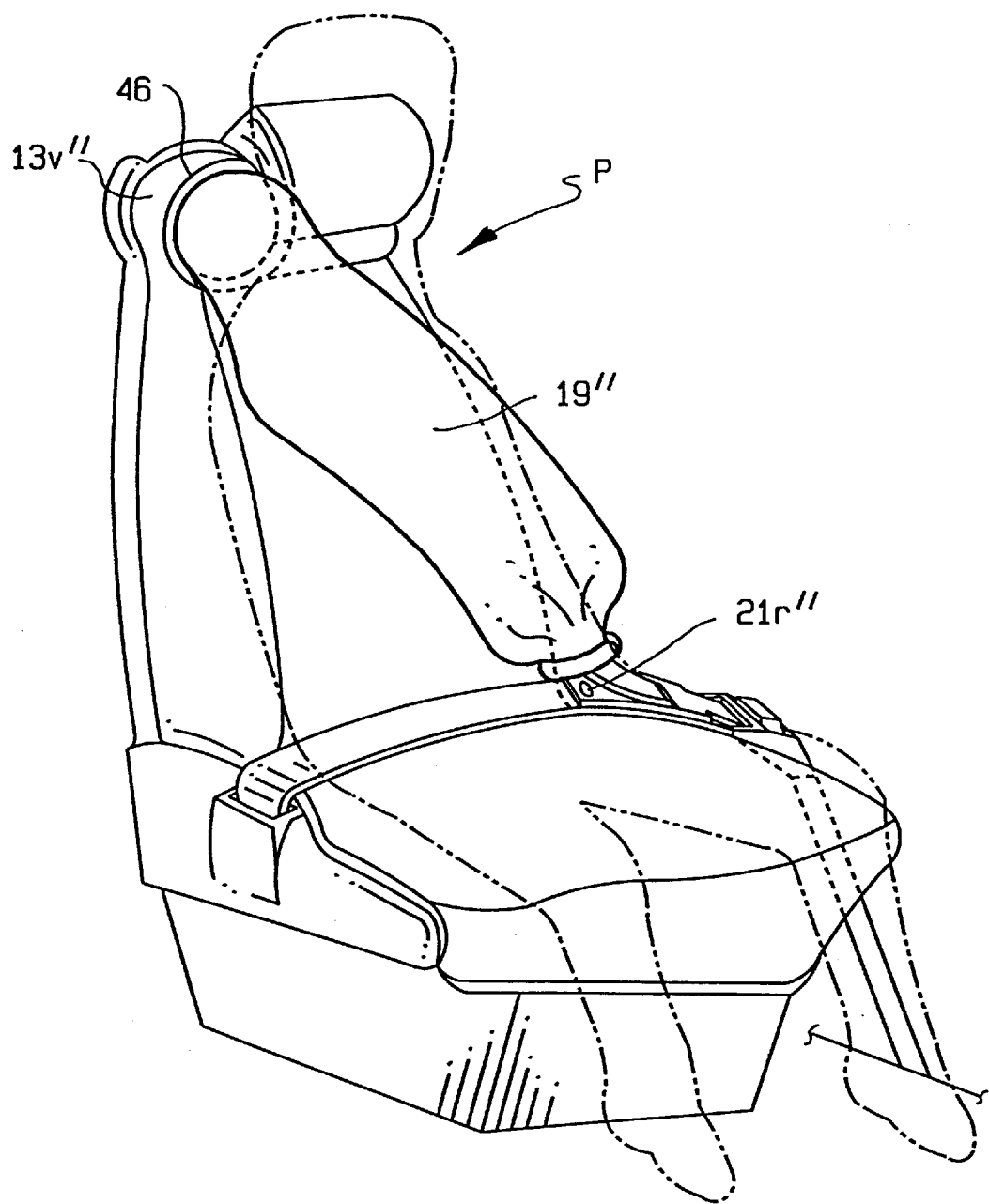
FIG. 6B is the view of FIG. 6A with the torso belt portion inflated.

In FIGS. 6A and 6B, a further alternative arrangement is shown in which belt section 19" exits from a horizontal rectangular slot 42 in turnable cylindrical unit piece 45 mounted in a stationary cylinder 46 in upper seat portion 13v". FIG. 6B shows torso belt section 19" inflated.

Figure 7A:
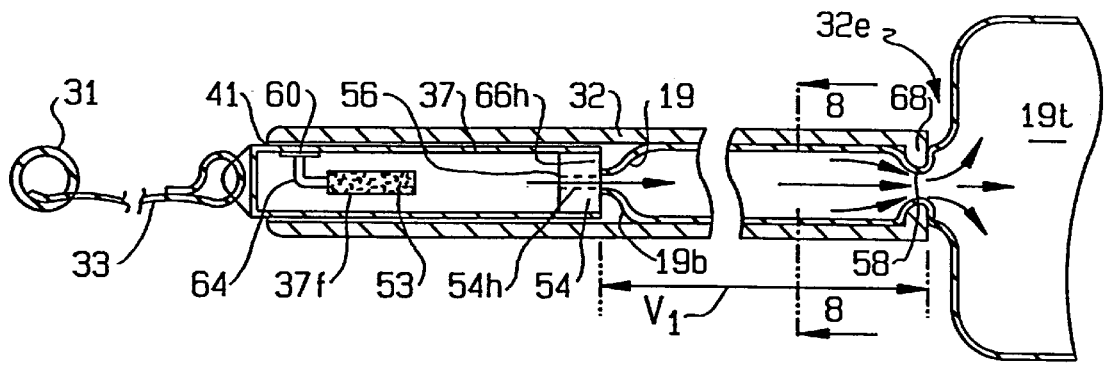
FIG. 7A is a side elevational sectional view of the belt enclosure with a portion of the torso belt in the buckle up position for a small passenger and thereafter inflated.
Figure 7B:
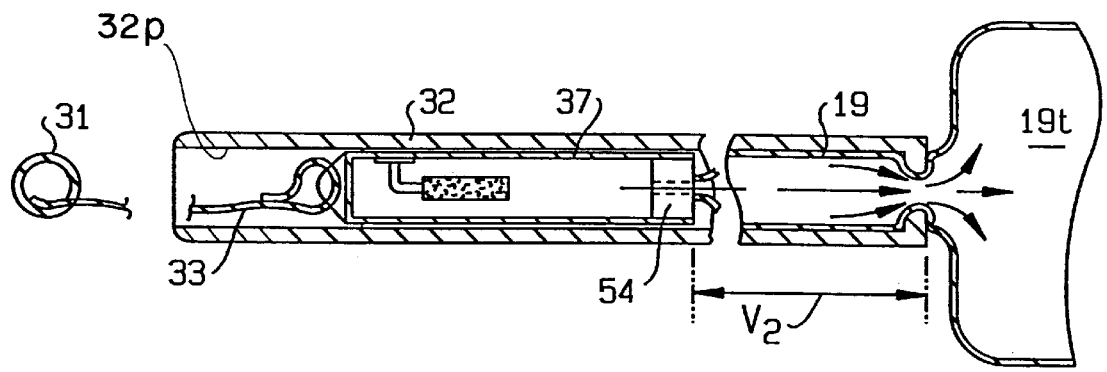
FIG. 7B is a side elevational sectional view of the belt enclosure with the torso belt further withdrawn to serve a larger passenger and thereafter inflated.
Figure 8:
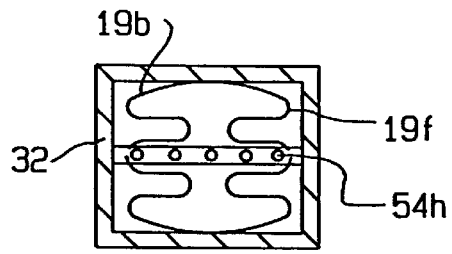
FIG. 8 is a sectional view taken along line 8—8 of FIG. 7A.

FIGS. 7A and 7B show retractor 31, belt lead web 33, inflator 37 having frangible burnable-material container 37f therein, inflatable belt portions 19b and 19t and enclosure 32. Belt portion 19b is the belt portion in enclosure 32 upon buckling up. Belt portion 19t is the belt portion outside enclosure 32 upon buckling up. These belt portions 19b, 19t vary with the size and shape of the passenger (P) being protected. Further shown in FIG. 7A are inflator squib 60, inflator manifold chamber 54, gas exit holes 54h and enclosure restricted orifice 68 at enclosure exit 32e. Also shown is burnable material 53 in container 37f. FIG. 8 shows folded belt 19 with belt folds 19f expanded unsubstantially as confined by enclosure 32.

Figure 7C:
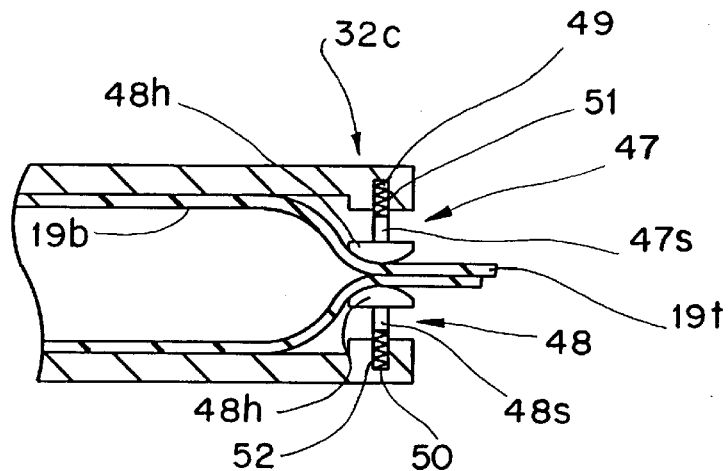
FIG. 7C is a partial sectional view of the enclosure end orifice and an arrangement to vary the size of the orifice with the orifice in the closed position just before gases flow out of the enclosure.

Enclosure exit orifice may alternatively be constructed to vary in size as the system operates. Referring to FIG. 7C, opposed plungers 47, 48 including plunger stems 47s,48s, and curved plunger heads 47h, 48h are urged toward one another by springs 49, 50. Plunger stems 47s, 48s and springs 49, 50 are mounted in recesses 51, 52 in enclosure end 32e. Heads 47h, 48h are urged against belt 19 including its portions 19b and 19t. When gas pressure is generated in belt 19, the gas pressure causes plungers 47, 48 to move away from one another allowing gas to flow out of enclosure 32 into belt section 19t. The greater the gas pressure the farther apart plungers 47, 48 move.

Figure 7D:
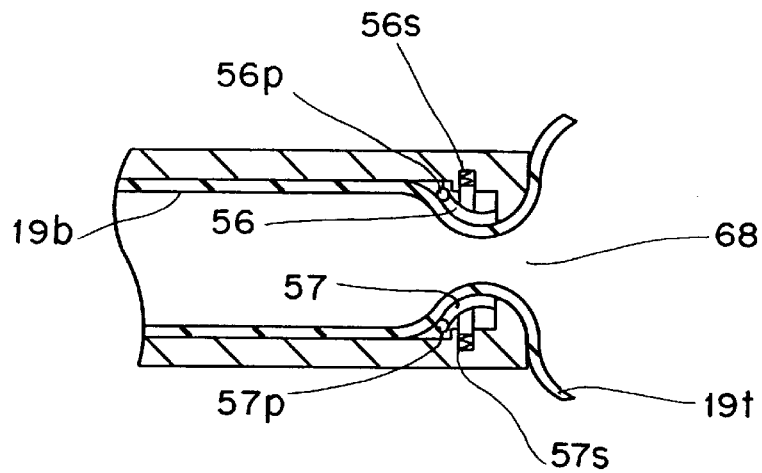
FIG. 7D is a partial sectional view of an alternative orifice size varying arrangement opened by gas pressure.
Figure 7E:
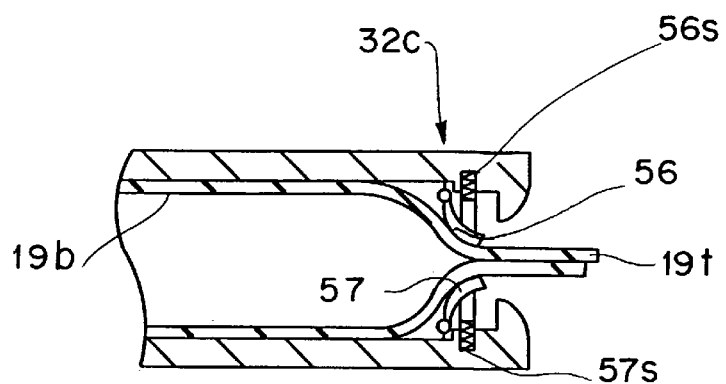
FIG. 7E is a view similar to FIG. 7D with the orifice partially closed just before gases flow out of the enclosure.

FIGS. 7D and 7E show an alterative arrangement for varying the size of orifice 68 in which flappers 56, 57 are pivoted about pins 56p, 57p and urged toward one another by springs 56s, 57s.

In practice, the above-described orifice varying arrangements act to achieve a somewhat constant pressure valve action in enclosure end 32e and its internal belt section 19b during inflation.

Figure 10:
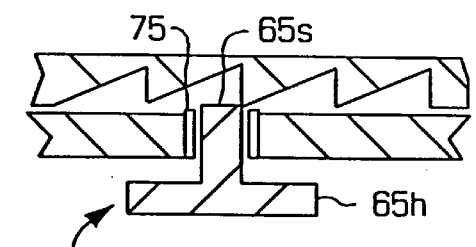
FIG. 10 is an enlarged view of a portion of FIG. 9.
Figure 9:
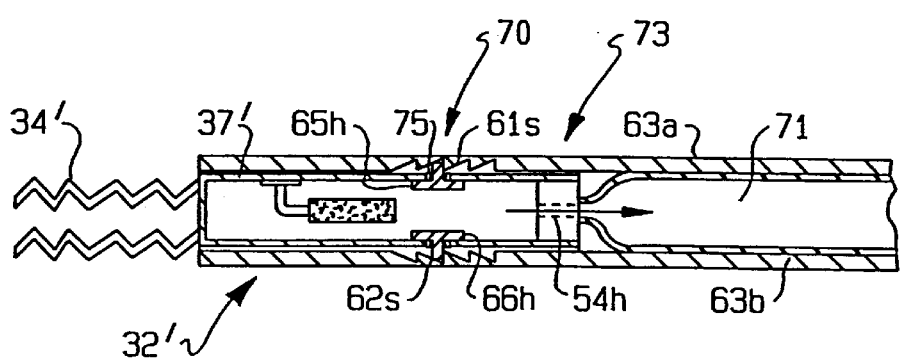
FIG. 9 is a side elevational view showing locking means for locking the inflator to the enclosure.

Turning to FIGS. 9 and 10, there is shown further details of an embodiment relating to FIG. 4 in which inflator 37' is attached to spring 34'. Spring 34' is relatively weak so that passenger (P) can pull on belt portion 19 with a small force of a few pounds. To prevent further extension or breaking of spring 34 when system operates to restraint passenger (P) in a collision one of several locking arrangements 70 can be employed. For example, a "webbing sensitive" locking retractor may be employed or in the case of the arrangement shown in FIG. 4, utilizing springs instead of a belt take-up reel, locking arrangement 70 may be used which includes serrations 61s, 62s in enclosure 32' walls 63a, 63b. Lock pins 65, 66 with stems 65s, 66s and heads 65h, 66h are housed in bushings 75 and 76 (not shown) which lock pins 65, 66 are caused to move outwardly by gas pressure upon activation of system. Stems 65s, 66s engage serrations 61s, 62s in walls 73a, 73b of enclosure 37' to anchor inflator 37' when gas pressure acting on lock pin heads 65h, 66h causes pins 65, 66 to move outwardly.

Figure 11:
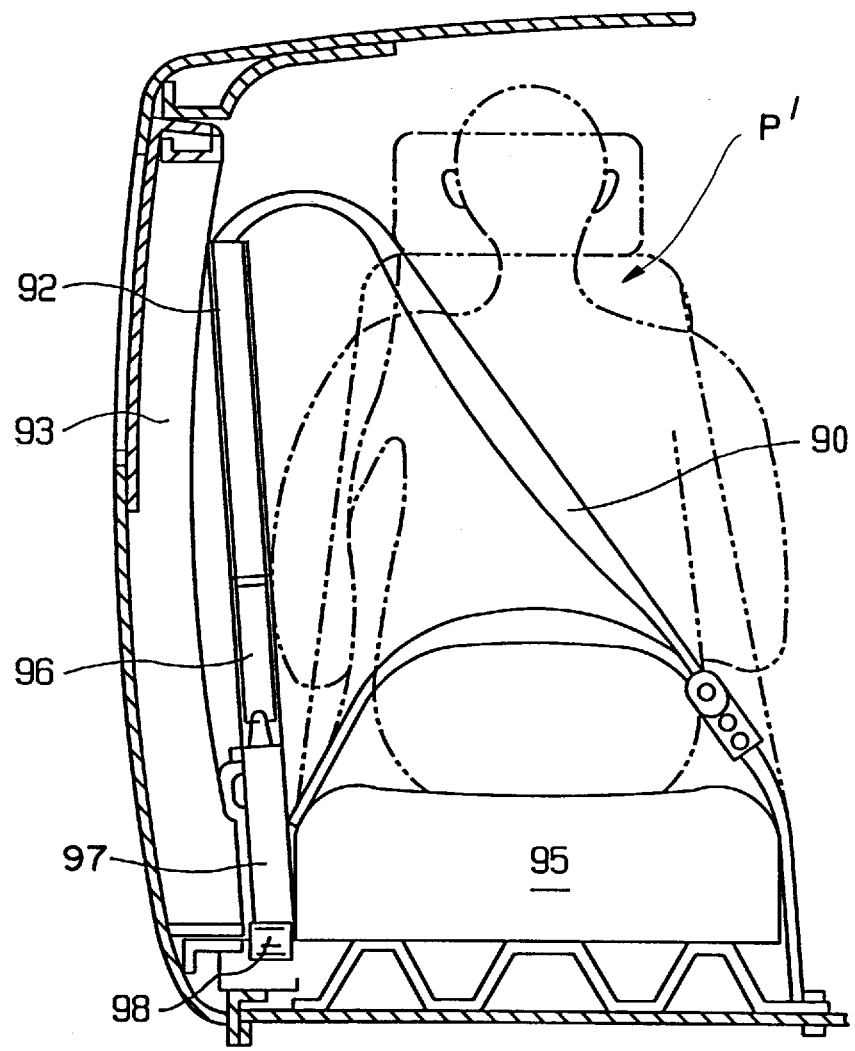
FIG. 11 is a sectional view through a vehicle showing a further embodiment in which the belt enclosure is mounted adjacent or into an auto frame.

FIG. 11 illustrates a further embodiment of the present invention in which the enclosure-passageway unit for housing the inflator and torso belt section is located on the vehicle frame. Alternately, it may be located within the vehicle e.g. the "B" pillar or alongside the roof rail (not shown). Passenger (P') is protected by inflatable torso belt section 90 which is housed in an enclosure 92 mounted on vehicle pillar 93. The torso belt section 90, inflator 96 and lead belt web 97 reciprocally operate in enclosure 92 in the same manner as shown in FIGS. 2 and 3. Retractor 98 is also shown. Alternately, the retraction system as shown in FIG. 4 may be used.

Figure 12:
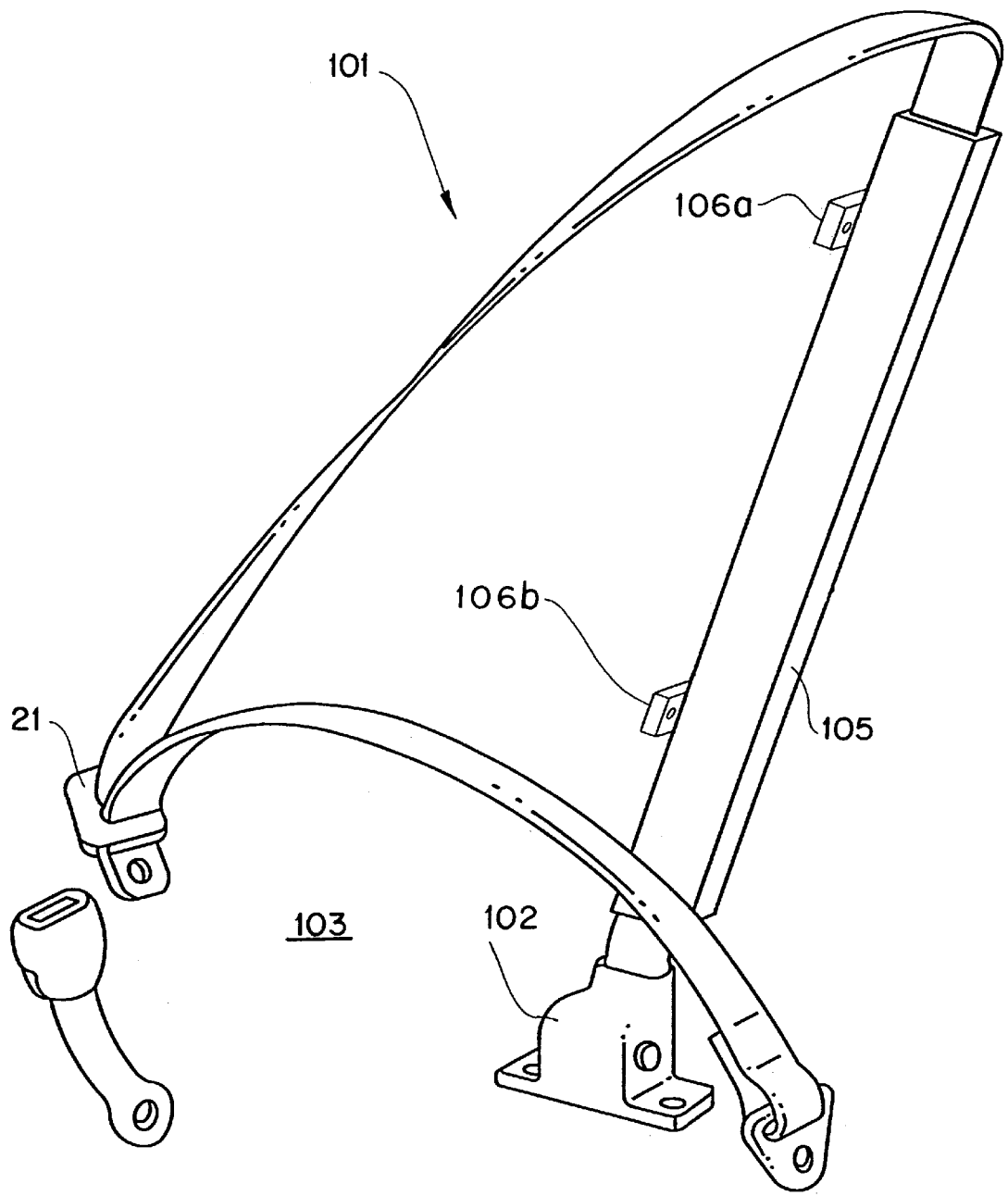
FIG. 12 is a perspective view of a restraint system in which the enclosure is attached to a vehicle seat using brackets.

Finally, turning to FIG. 12, a restraint system 101 is shown, which system can readily be installed to serve passenger (P) in vehicles with minimum vehicle design change required. Belt restraint system 101 includes a belt band take-up reel 102 mounted on vehicle floor 103. Enclosure 105 for restraining belt inflation is attachable to the vehicle seat by brackets 106a, 106b or other suitable means. Also shown is buckle tongue 21'.

In the operation of belt system of the present invention, passenger (P) sits in the seat 10 and pulls buckle tongue 21 or 21' to draw it across his or her lap area from right to left. As he or she draws buckle tongue unit 21 or 21' across his or her lap, the inflatable portion of belt band 16 is partially withdrawn from enclosure 32 and simultaneously uninflatable lap belt section 20 is withdrawn from its reel retractor 36 with the majority of band 16 coming out of retractor 31. As belt section of band 19 is withdrawn from enclosure 32 and tandemly interconnected band web 33 is also withdrawn from retractor 31. When torso belt section 19 is pulled on by passenger (P) during buckling up, inflator 37 and unreeling web 33 move up enclosure 32. After pulling buckle tongue 21 across his or her lap, buckle tongue 21 is inserted into seat-side anchor 22.

Upon buckling up, torso belt section 19 has a belt portion 19b in enclosure 32 and another belt portion 19t outside the enclosure 32. Belt portion 19t is positioned across the passenger's torso. The withdrawal of band web 33 from retractor 31, position of inflatable belt section 19 with respect to enclosure 32 and uninflatable belt section 20 withdrawn from retractor 36 to accomplish buckling-up depends on the size and shape of passenger (P). When the buckle tongue 21 is released from the anchor 22 and retractor reels 31, 36 take up their respective belt portions, inflator 37 moves downward in enclosure 32 toward retractor reel 31 as shown in FIG. 2.

Returning to FIG. 3, upon a crash deceleration of the vehicle, inflator 37 is activated to create burning pyrotechnic material 53 which creates gases in manifold 54 which in turn cause gas flow out holes 54h into belt portion 19b of the inflatable belt section 19. Portion 19b of inflatable shoulder belt section 19 remaining in enclosure 32 cannot inflate any significant amount beyond the confines of enclosure 32 which is structurally rigid. Folded belt portion 19b will expand only slightly to fill enclosure 32 (FIG. 8). The remaining length of the torso belt portion 19t between the upper exit end of the enclosure 32e and belt tongue 21 is inflated causing passenger (P) to be drawn backward in seat 10 as he or she is restrained.

High gas pressure (i.e., 20,000 lb./in$^2$) is created in inflator 37 causing gases to rapidly pass out of inflator 37 through manifold holes 54h into folded belt portion 19b and toward restriction orifice 68 in enclosure end 32e and then into the belt portion 19t which portion is free to fully inflate. Belt portion 19t, as positioned across the torso of passenger (P) is inflated to a relatively low pressure (i.e. 15 lb./in$^2$ gauge). The gas pressure in folded belt portion 19b in enclosure 32 is intermediate between the very high pressure in inflator 37 and the low pressure in belt portion 19t. During the entire inflation period (i.e. 10 milliseconds), gas pressure in belt portion 19b remains at a relatively intermediate level due in part to orifice 68 in enclosure exit 32e which functions to restrict flow of gases to belt portion 19t and the control of manifold orifice holes 54h regulating the rate of flow entering belt section 19t.

The position of inflator 37 in enclosure 32 varies the volume available to accommodate gases discharged from inflator 37 as they exit inflator 37, flow through belt portion 19b, through belt restriction determined by orifice 68 and into belt portion 19t across the passenger's torso. When inflator 37 is positioned farther from enclosure exit 32e, the volume ($V_1$) to accommodate inflator gases is larger (FIG. 7a) and when the inflator 37 is closer to enclosure exit 32e the volume ($V_2$) is smaller (FIG. 7b). Thus, when a smaller person is belted in seat 10, the amount of torso belt portion 19b withdrawn from enclosure 32 is smaller. Further, since the length of inflatable belt portion 19 is a constant (which length is measured by inflator 37 (FIG. 7A) and belt end 19a adjacent uninflatable lap belt 20 enclosure 32 (FIG. 4B), the length of belt portion 19t to be inflated outside enclosure 32 is shorter for a smaller passenger. Further, for the smaller person, the volume $V_1$ in enclosure 32 to accommodate inflator gases as they flow into the inflatable portion of the belt portion 19b is larger. Since the amount of gas produced by inflator 37 is constant, the pressure in enclosure 32 is therefore smaller at any given time during inflation as related to the large volume.

The present invention also best serves the larger person who draws out more inflatable belt 19 when he or she buckles up, leaving a smaller enclosure volume $V_2$ to accommodate the gases produced by the inflator resulting in higher pressures at any given time during the inflation to serve to inflate the longer portion of belt portion 19t restraining such larger person more fully at any given time.

The present system protects passenger occupants by varying the positioning of a fixed length of the inflatable torso belt section and varying the amount of inflator gases flowing into torso belt portion 19t at any given time positioned to restrain the passenger.

Through use of the belt system disclosed herein, seated passenger protection for small and larger passengers is accomplished by the steps of:

1) locating a passageway enclosure adjacent to the passenger seat;
2) providing a selected length of inflatable belt having two ends which belt is long enough to protect the large passenger and short enough to terminate in the enclosure when protecting a small passenger;
3) connecting one torso belt end in the passageway enclosure to a belt length anchor means extending into the enclosure and anchoring the other torso belt end to an anchor to position and support the belt so that it can protect the passenger upon inflation; and
4) upon deceleration of a collision, introducing gases from an inflator into the portion of the torso belt portion located in the enclosure which gases thereafter flow through the remaining torso belt portion outside the enclosure which inflated portion protects the torso of the passenger.

Since gas inflators generate a given volume of gas per unit time when activated and since a large passenger requires more gas to inflate the longer belt portion which protects him or her, the above method protects a large passenger by providing a sufficient gas supply to service the large passenger's needs while a smaller portion of such gas remains in belt portion 19b in the enclosure. Similarly, the practice of the method protects the small passenger by supplying less gases per unit time to the belt portion protecting the small passenger with the remainder of the gases created by the inflation remaining in that larger portion 19b of the belt in enclosure 32 upon activation.

The practice of this inventive method divides the gaseous volume produced by the inflator between the portion of the inflatable belt in the enclosure maintained for a brief period at an intermediate filling pressure and the portion of the inflatable belt outside the enclosure which protects the passenger's torso maintained at protection pressure. Such division is dependent on the relative volumes of the belt portions in and outside the enclosure and rate of flow of the gases from the inflator during time available to inflate the belt portion positioned to protect the decelerating passenger. The sum of the pressures and volumes is however nearly constant to cooperate with the nearly constant output of the inflator.

I claim:

1. A vehicle including a vehicle passenger restraint system to protect both a large seated passenger and a small seated passenger upon deceleration of a crash comprising:
   a) a tandem inflatable belt band arrangement having three anchor means including a lap belt section with two ends anchored and a inflatable torso section fixed in length upon buckling up having two ends with one end anchored to a reel deceleration-locked third anchor means and one end secured to the lap belt section; said fixed length inflatable torso section fixed in length after a selected length has unreeled from said third reel anchor means upon buckling-up said torso section in turn comprising two portions:
      i) a first inflatable portion adapted to be positioned across and adjacent to the passenger torso which portion is longer for a larger passenger and shorter for a small passenger; and
      ii) a second inflatable portion restrained from substantial inflation;
   b) a second inflatable portion confinement means for restraining the second inflatable portion from substantial inflation and leaving the first inflatable portion free to inflate, said confinement means having an exit port through which the inflatable belt band arrangement passes; and
   c) inflator means for producing and introducing gases of a selected volume into the second inflatable portion which gases flow through such second inflatable portion out said exit port of the confinement means and into such first inflatable portion whereby the (1) length of the first inflatable portion is upon buckling-up and deceleration of a crash longer for a large passenger and (2) the length of the first inflatable portion is shorter for a small passenger thus the inflator means supplying more gases to the inflatable first portion for the large passenger and supplying less gases to said inflatable first portion for the small passenger.

2. The restraint system of claim 1 in which the second inflatable portion is anchored upon rapid vehicle deceleration by the third reel anchor means.

3. The restraint system of claim 1 in which an inflator means is positioned in the confinement means for reciprocating therein and said inflator means is tandemly connected to an anchorable end of said second inflatable portion.

4. The restraint system of claim 1 in which the confinement means and the inflator means therein include a lockable arrangement to lock the inflator means to the confinement means when gases are produced in the inflator means to prevent said second inflatable portion from being moved out of the confinement by the passenger.

5. The restraint system of claim 1 in which the confinement means is an elongated passageway enclosure.

6. The restraint system of claim 5 in which a lockable arrangement includes a plurality of recesses in the passageway enclosure and a projection extendable from the inflator means into at least one recess to create a lock so that the torso belt is not moved further from the passageway enclosure by the passenger.

7. The restraint system of claim 1 in which the confinement means is mounted in the vehicle in a position such that the first inflatable portion of tandem inflatable belt band is readily deployed across the passenger's torso.

8. The restraint system of claim 1 in which confinement means includes a belt band enclosure having a cross-section and said exit port having a cross-section which is less than the cross-section of the enclosure.

9. The restraint system of claim 8 in which the cross-section of the exit port including means for varying the size of such port.

10. The restraint system of claim 9 in which the cross-section of the exit port is varied by movable closure means and the exit port is increased in cross-section by gas pressure.

11. A vehicle restraint system for protecting a passenger having a torso and a lap comprising:
    (a) vehicle seat with a seat portion having two sides and having a back portion with an upper end;
    (b) a tandem belt band arrangement adapted to be positioned across and adjacent to the passenger's lap and torso which arrangement is positionable and operable to allow the passenger to enter the vehicle and to sit in the seat and a to extend over and adjacent to the passenger's lap and across and adjacent to the torso into a buckled-up position, the tandem band arrangement including
        i) three anchors having an anchor adjacent each side of the seat and a reel deceleration-locked third anchor;
        ii) a lap belt section attachable to the seat side anchors;
        iii) an inflatable torso section supported at one end by the lap belt section and at the other end by inflator means which in turn is interconnected to the third anchor means;
    (c) enclosure means adjacent the seat back portion with two ends, one end adjacent the third anchor and the other end adjacent the upper end of the back portion, said enclosure means enclosing and providing for reciprocal movement of the inflator means and inflatable torso section therein during passenger buckling up and unbuckling in which the tandem belt band arrangement reels on and off said third anchor, such enclosure means sized and shaped to prevent substantial inflation of a portion of the inflatable torso section in such enclosure;

whereby the position of the inflator means and of the inflatable torso section is closer to the upper enclosure end adjacent the upper end of the back portion when a large passenger is buckled up and the inflator means is farther from such enclosure end adjacent the upper end of the back portion when a small passenger is buckled up.

12. The vehicle restraint system of claim 11 in which the third anchor comprises in turn a windable web means connected between the inflation means and a retractor.

13. The vehicle restraint system of claim 11 in which the third anchor comprises a lockable arrangement between the inflator and the enclosure.

14. The restraint system of claim 13 in which the lockable arrangement locks the inflator means to the enclosure means when gases are produced in the inflator means to prevent the torso belt from being moved by the decelerating passenger.

15. The restraint system of claim 11 in which a lockable arrangement includes a plurality of recesses in the enclosure and a projection extendable from the inflator means into a recess to create a lock so that the torso belt is not moved further out of enclosure by the decelerating passenger.

16. A method of varying the volume of gases flowing into a vehicle restraint belt portion for inflation of the belt portion to protect a vehicle passenger upon crash deceleration comprising:
    1) providing two anchor means;
    2) providing a fixed length of inflatable torso belt between such anchor means upon crash deceleration such belt length deployed to protect the passenger with a shorter length of belt portion being provided for smaller passengers and a longer length of the belt portion for larger passengers;

3) providing enclosure means for a portion of the inflatable belt not deployed to protect the passenger which enclosure means prevents any substantial inflation of such belt portion not deployed;

4) providing a third retractable anchor means and then causing the passenger to buckle up while providing a sufficient length of belt portion to protect the passenger's torso and leaving the remaining belt portion deployed in such enclosure means; and 5) providing inflation means to introduce gases, whereby upon crash vehicle deceleration, introducing into the inflatable belt portion in the enclosure means gases which flow along the belt length to the belt portion outside the enclosure which portion deployed protects the passenger's torso.

17. The method of claim 16 the step of providing a lockable arrangement to lock the inflation means to the enclosure means when the gases are produced by the inflation means to prevent the torso belt from being moved further out of the enclosure by passenger deceleration.

18. The method of claim 17 having the further step of positioning the inflation means reciprocally positioned in the enclosure means and tandemly connected to the third retractable anchor means.

19. The method of claim 16 having the further step of providing a pressure activated lockable arrangement to lock the inflation means to the enclosure means.

20. The method of claim 19 having the further step of providing in the lock arrangement a plurality of recesses in the passageway enclosure means and providing a projection extendable from the inflation means into one or more of such recesses to create a lock so that the torso belt is not moved further out of the enclosure means by passenger deceleration.

21. The method of claim 16 providing the enclosure means as an elongated passageway enclosure.

22. The method of claim 16 further providing the step of providing the enclosure means with a cross-section and an exit port from which the torso belt exits during buckling up which exit port cross-section is smaller than the cross-section of the enclosure means.

23. The method of claim 22 further providing the exit port with pressure-responsive means for varying its cross section and in which the exit port cross-section increases when gas pressure therein increases.

* * * * *